Dec. 9, 1969    K. STEFFENS    3,483,043
CASING FOR ELECTRODE ASSEMBLIES OF ELECTRIC STORAGE CELLS
Filed Oct. 11, 1967

INVENTOR
KARL STEFFENS
BY Michael Striker,
his ATTORNEY

United States Patent Office 3,483,043
Patented Dec. 9, 1969

3,483,043
CASING FOR ELECTRODE ASSEMBLIES OF
ELECTRIC STORAGE CELLS
Karl Steffens, Hagen-Vorhalle, Germany, assignor to
Varta Aktiengesellschaft, Frankfurt am Main,
Germany
Filed Oct. 11, 1967, Ser. No. 674,513
Claims priority, application Germany, Oct. 21, 1966,
V 32,173
Int. Cl. H01m 1/02
U.S. Cl. 136—166                                   11 Claims

ABSTRACT OF THE DISCLOSURE

A casing which can be used to accommodate and to compress the components of an electrode assembly in an electric storage cell comprises two cupped portions which are connected to each other by mating threads or by a bayonet lock. Each cupped portion can be provided with one or more windows and the bottom wall of each cupped portion is provided with an opening for the contact spring of a terminal which further includes a perforated disk-shaped metallic element provided in the respective cupped portion and overlying the corresponding opening. The internal surfaces of the cupped portions, which consist of insulating material, are coated with layers of metal and each cupped portion can be provided with internal spacers in the form of cams or lobes to center the respective electrode.

Background of the invention

The present invention relates to electric storage cells or accumulators in general, and more particularly to improvements in the cells of the type which employ disk-shaped electrodes.

In presently known storage cells which employ disk-shaped electrodes, the electrodes are assembled under pressure. The end plates of a fully assembled electrode assembly are placed against plastic disks and are subjected to compressive stresses prior to application of metallic bandages around the resulting assembly to maintain the electrodes under initial compression. It is also known to replace metallic bandages with cords consisting of plastic material which are wrapped several times around a complete electrode assembly to maintain the electrodes under a requisite initial compression. Both methods are unsatisfactory for a variety of reasons, particularly because the bandages or cords must be removed in a time-consuming operation whenever it becomes necessary to inspect, repair or replace the components of the assembly. As a rule, the bandages must be cut or otherwise destroyed.

Furthermore, the aforedescribed methods of maintaining electrode assemblies under initial compression are unsatisfactory in connection with the electrode assemblies of button-type storage cells. This is due to the fact that the bandages or cords hinder withdrawal of current and occupy too much room with attendant reduction in the capacity of such cells. Also, and as mentioned above, the bandages or cords must be destroyed so that the repair or inspection of such assemblies is not only time-consuming but also costly and invariably involves the use of machines to allow for satisfactory winding of fresh cords or bandages upon completion of an inspection or repair.

Summary of the invention

It is an object of my invention to provide a novel and improved device which can subject the electrode assembly of an electric storage cell to requisite compressive stresses and which need not utilize bandages or cords.

Another object of the invention is to provide an electric storage cell, particularly a button-type storage cell, with a novel casing or enclosure for the eloctrode assembly which permits rapid dismantling of the assembly, inspection and/or repair of parts, or salvaging of usable parts in a defective assembly, and which can be produced at a cost which is but a fraction of the cost involved in properly mounting and compressing electrode assemblies in conventional storage cells.

An additional object of my invention is to provide an electrode assembly with a casing or enclosure which can be taken apart to afford access to the electrode assembly without necessitating the use of any special tools and which can subject the electrodes of the assembly to desired compressive stresses to insure satisfactory contact with the separator or separators.

A further object of the invention is to provide a casing or envelope of the above outlined character which can be furnished in many sizes and/or shapes.

The improved casing comprises a plurality of portions and connecting means separably securing the portions to each other. In accordance with a presently preferred embodiment of my invention, the casing consists of two round cups which are coupled to each other by mating internal and external threads or by one or more bayonet locks. The annular portions of the cups can be provided with windows which are distributed in the circumferential direction of the respective annular portions and may but need not be of identical configuration. The cups consist of insulating material and their internal surfaces can be coated with layers of metal. Furthermore, the internal surfaces of the cups can be provided with spacers in the form of cams which center the electrodes in the respective cups. The terminals or lead-ins preferably comprise disks of porous or perforated metallic material which overlie openings provided in the bottom walls of the cups, and contact springs which are affixed to the disks and extend outwardly through the respective openings.

The novel features which are considered as characteristic of the invention are set forth in particular in the appended claims. The improved casing itself, however, both as to its construction and its mode of operation, together with additional features and advantages thereof, will be best understood upon perusal of the following detailed description of certain specific embodiments with reference to the accompanying drawing.

Description of the preferred embodiments

Figure 1:
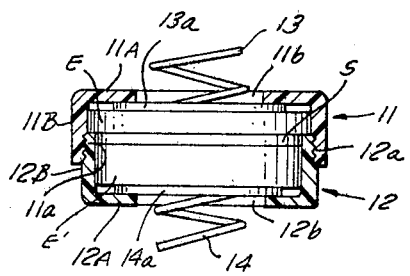
FIG. 1 is an axial sectional view of a casing which embodies one form of my invention and wherein the portions of the casing are connected to each other by threads.

Referring first to FIG. 1, there is shown a casing which includes two round cup-shaped portions 11, 12 (hereinafter called cups for short). The cup 11 comprises a bottom wall 11A and an annular portion 11B which is provided with internal threads 11a mating with external threads 12a provided on the annular portion 12B of the cup 12. The bottom walls 11A, 12A of the cups 11, 12 are provided with centrally located openings 11b, 12b for portions of contact springs 13, 14 which form part of two terminals or lead-ins. These terminals further include disk-shaped metallic elements 13a, 14a which are located in the casing and overlie the respective openings 11a, 12a.

The cup 11 accommodates a negative electrode E and the cup 12 accommodates a positive electrode E'. The two electrodes are disposed at the opposite sides of a separator S The cups 11, 12 consist of insulating material, preferably of a synthetic plastic substance The electrodes E and E' can but need not be provided with customary envelopes of wire mesh, preferably nickel wire The cups 11, 12 are screwed together to such an extent that the electrodes E and E' are subjected to requisite pressure and are in satisfactory contact with the separator S. The fully assembled casing is then subjected to a preliminary electric treatment subsequent to a joint decarbonization of the electrodes The connection between the cups 11, 12 can be terminated at will and with little loss in time to facilitate repair, replacement of damged parts, or salvage of satisfactory parts.

Figure 4:
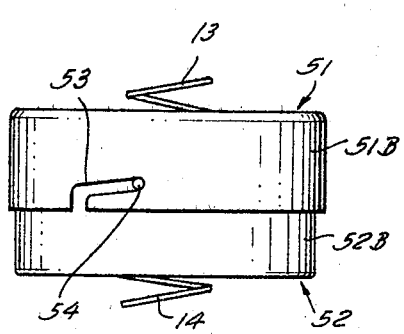
FIG. 4 is a side elevational view of a fourth casing wherein the portions of the casing are connected to each other by a bayonet lock.

FIG. 4 shows a second casing wherein the connection between the cups 51, 52 comprises a bayonet lock including a bayonet slot 53 provided in the annular portion 51B of the cup 52. The connection may comprise two or more bayonet locks and the inclination of the circumferentially extending portion of the bayonet slot 53 is such that the electrode assembly in the casing is subjected to requisite compressive stresses. The terminals are assembled in the same way as shown in FIG. 1; only the contact springs 13, 14 being visible in FIG. 4. The cups 51, 52 preferably consist of plastic material.

Though it is possible to provide the casing for the electrode assembly with a pair of cups which are simply telescoped into each other and are permanently connected by adhesive or by welding, the constructions shown in FIGS. 1 and 4 are preferred because the electrode assemblies are accessible without necessitating destruction of casings.

Figure 2:
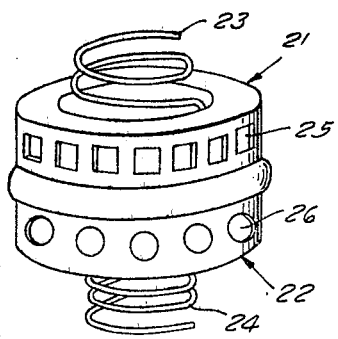
FIG. 2 is a perspective view of a second casing wherein the portions of the casing are provided with windows.

FIG. 2 shows a third casing which comprises two cups 21, 22 connected to each other by mating threads in a manner as shown in FIG. 1 or by one or more bayonet locks of the type shown in FIG. 4. The annular portion of the cup 21 is provided with a set of circumferentially spaced windows 25 of polygonal outline and the annular portion of the cup 22 is provided with a set of round windows 26. The windows 25, 26 permit working of the mass in the casing and enhance the circulation of gases as well as satisfactory exchange of heat. The configuration, number and size of the windows 25, 26 can be changed without departing from the spirit of my invention. The cups 21, 22 preferably consist of synthetic plastic material. The contact springs are shown at 23 and 24.

Figure 3:
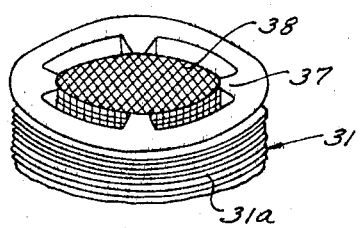
FIG. 3 is a fragmentary perspective view of a portion of a third casing.

FIG. 3 illustrates a portion of a fourth casing which includes a cup 31 having external threads 31a which can be placed into mesh with internal threads provided on the second cup, not shown. The cup 31 consists of synthetic plastic material and its internal surface is provided with spacers in the form of inwardly extending cams or protuberances 37 which center an electrode 38. The annular portion of the cup 31 need not be provided with windows. The bottom wall (not shown) of the cup 31 is also provided with spacers for the electrode 38 so that this electrode can be readily contacted by circulating gases. The disk-shaped portion of the terminal (not shown) preferably consists of perforated metallic sheet stock to further enhance the circulation of gases. The other cup of the casing which includes the structure shown in FIG. 3 is preferably similar to the cup 31.

The consumption of gases and the dissipation of heat can be improved still further if the internal surfaces of the cups are coated with layers of metallic material, preferably by resorting to a currentless chemo-galvanizing process.

An important advantage of my improved casing is that it can replace expensive envelopes of nickel wire mesh which are employed in presently known storage cells to form wrappers around one or both electrodes. Attempts to employ negative electrodes without such envelopes have met with little success because the electrodes tend to curve away from the separators, especially along the edges of the electrodes, whereby the thus separated portions of electrodes cannot participate in the supply of current. In fact, the tendency of electrodes to move away from the separator is observable even if the electrodes are surrounded by envelopes of nickel wire or the like. This is due to the fact that such electrodes are normally pressed against the separator by springs each of which is in a mere three-point contact with the respective electrode. Pressure transmitted through such limited number of points is insufficient to insure satisfactory contact between the electrodes and the separator. The improved casing insures a very satisfactory contact between the electrodes and the separator because the two cups can be brought into mesh to such an extent that the electrodes are subjected to requisite compressive stresses which are uniformly distributed along the entire area of contact between the electrodes and the separator. The same applies for the compressive action of the casing shown in FIG. 4. Furthermore, the electrode assembly in the casing of my invention may include a positive electrode which is also without an envelope of nickel wire or the like because the cups hold the mass of the positive electrode together and prevent segregation of the positive electrode from the separator. The fact that the positive electrode E' will expand radially to a greater extent than the negative electrode E is of no consequence; such differences in radial expansion of the electrodes can be readily compensated for by reducing the number and/or the combined area of windows in the annular portion of the cup which accommodates the positive electrode. The manufacturing cost of plastic cups is but a fraction of the cost involved in the manufacture and application of envelopes of nickel wire which are used in presently known electrode assemblies for electric storage cells.

Without further analysis, the foregoing will so fully reveal the gist of the present invention that others can, by applying current knowledge readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A casing for the electrode assembly of an electric storage cell which includes a pair of electrodes and a separator sandwiched therebetween, said casing comprising a pair of cups; connecting means for releasably connecting said cups to each other and for pressing the electrodes against the separator; and spacer means in form of a plurality of projections projecting from the inner surface of at least one of the cups for keeping the outer surface of the electrode located therein spaced from the inner surface of said at least one cup to thereby permit circulation of gases between the inner surface of said one cup and the outer surface of the electrode therein.

2. A casing as defined in claim 1, wherein said connecting means comprises mating threads provided on said cups.

3. A casing as defined in claim 1, wherein said connecting means comprises a bayonet lock having cooperating male and female portions provided on said cups.

4. A casing as defined in claim 1, wherein at least one of said cups is provided with at least one window.

5. A casing as defined in claim 1, wherein said cups consist of insulating material.

6. A casing as defined in claim 1, wherein each of said cups comprises a terminal.

7. A casing as defined in claim 6, wherein each of said cups has a bottom wall provided with an opening and each of said terminals comprises a disk located in the respective cup and overlying the corresponding opening.

8. A casing as defined in claim 7, wherein said disks are perforated.

9. A casing as defined in claim 8, wherein each of said terminals further comprises a contact spring affixed to the respective disk and extending through the corresponding opening.

10. A casing as defined in claim 1, wherein each of said cups has an annular portion provided with a plurality of circumferentially spaced windows.

11. A casing as defined in claim 10, wherein the configuration of windows in one of said annular portions is different from the configuration of windows in the other annular portion.

References Cited

UNITED STATES PATENTS

| 2,580,415 | 1/1952 | Ellis | 136—133 |
| 2,617,863 | 11/1952 | Stinson | 136—166.1 |
| 2,993,948 | 7/1961 | Vaclaw | 136—166 |
| 3,003,013 | 10/1961 | Duddy | 136—111 |

FOREIGN PATENTS 755,994   8/1956   Great Britain.

WINSTON A. DOUGLAS, Primary Examiner

D. L. WALTON, Assistant Examiner